(12) United States Patent
Cao et al.

(10) Patent No.: US 6,459,831 B1
(45) Date of Patent: Oct. 1, 2002

(54) WDM UTILIZING DIFFRACTION GRATINGS WITH POLARIZATION DEPENDENT LOSS COMPENSATION

(75) Inventors: Simon X. F. Cao, Pleasanton; Olga Gorbounova, Santa Clara; Kenneth John Bystrom; Hubert Joachim Vollmer, both of Tracy, all of CA (US)

(73) Assignee: Avanex Corporation, Fremont, CA (US)

( * ) Notice: Subject to any disclaimer, the term of this patent is extended or adjusted under 35 U.S.C. 154(b) by 5 days.

(21) Appl. No.: 09/586,250

(22) Filed: May 31, 2000

(51) Int. Cl.[7] ............................................. G02B 6/28
(52) U.S. Cl. ................................. 385/24; 359/117
(58) Field of Search .................... 385/2, 3, 8, 9, 385/11, 13, 24, 37; 359/117, 124, 128, 161; 370/223, 228, 242; 372/96, 106, 108

(56) References Cited

U.S. PATENT DOCUMENTS

| | | | | |
|---|---|---|---|---|
| 5,768,005 | * | 6/1998 | Cheng et al. | 359/281 |
| 5,844,710 | * | 12/1998 | Fukushima | 359/251 |
| 6,219,176 | * | 4/2001 | Terahara | 359/124 |
| 6,236,506 | * | 5/2001 | Cao | 359/112 |

* cited by examiner

*Primary Examiner*—Akm E. Ullah
(74) *Attorney, Agent, or Firm*—Sawyer Law Group LLP

(57) ABSTRACT

The present invention provides an improved wavelength division multiplexer (WDM). The WDM includes a birefringent plate; a reciprocal optical rotator optically coupled to the birefringent plate; and a diffraction grating optically coupled to the reciprocal optical rotator at a side opposite to the birefringent plate. This grating-based WDM provides very low polarization-dependent loss, and therefore, greatly reduces insertion loss. This increases the reliability of the data carried by the channels.

27 Claims, 14 Drawing Sheets

WDM UTILIZING DIFFRACTION GRATINGS WITH POLARIZATION DEPENDENT LOSS COMPENSATION

FIELD OF THE INVENTION

The present invention relates to diffraction gratings in optical communications networks and systems, and more particularly to wavelength division multiplexers utilizing diffraction gratings.

BACKGROUND OF THE INVENTION

Fiber optic communication systems are becoming increasingly popular for data transmission due to their high speed and high data capacity capabilities. Wavelength division multiplexing is used in such fiber optic communication systems to transfer a relatively large amount of data at a high speed. In wavelength division multiplexing, multiple information-carrying signals, each signal comprising light of a specific restricted wavelength range, may be transmitted along the same optical fiber.

In this document, these individual information-carrying lights are referred to as either "signals" or "channels." The totality of multiple combined signals in a wavelength-division multiplexed optical fiber, optical line or optical system, wherein each signal is of a different wavelength range, is herein referred to as a "composite optical signal."

The term "wavelength," denoted by the Greek letter $\lambda$ (lambda) is used herein in two senses. In the first usage, this term is used according to its common meaning to refer to the actual physical length comprising one full period of electromagnetic oscillation of a light ray or light beam. In its second usage, the term "wavelength" is used synonymously with the terms "signal" or "channel." Although each information-carrying channel actually comprises light of a certain range of physical wavelengths, for simplicity, a single channel is referred to as a single wavelength, $\lambda$, and a plurality of n such channels are referred to as "n wavelengths" denoted $\lambda_1 - \lambda_n$. Used in this sense, the term "wavelength" may be understood to refer to "the channel nominally comprised of light of a range of physical wavelengths centered at the particular wavelength, $\lambda$."

A crucial feature of fiber optic networks is the separation of the composite optical signal into its component wavelengths or channels, typically by a wavelength division multiplexer. This separation must occur to allow for the exchange of signals between loops within optical communications networks. The exchange typically occurs at connector points, or points where two or more loops intersect for the purpose of exchanging wavelengths.

FIG. 1a schematically illustrates one form of an add/drop system, which typically exists at connector points for the management of the channel exchanges. The exchanging of data signals involves the exchanging of matching wavelengths from two different loops within an optical network. In other words, each composite optical signal drops a channel to the other loop while simultaneously adding the matching channel from the other loop.

A wavelength division multiplexer (WDM) typically performs separation of a composite optical signal into component channels in an add/drop system. Used in its reverse sense, the same WDM can combine different channels, of different wavelengths, into a single composite optical signal. In the first instance, this WDM is strictly utilized as a de-multiplexer and, in the second instance, it is utilized as a multiplexer. However, the term "multiplexer" is typically used to refer to such an apparatus, regardless of the "direction" in which it is utilized.

FIG. 1a illustrates add/drop systems 218 and 219 utilizing wavelength division multiplexers 220 and 230. A composite optical signal from Loop 110 ($\lambda_1 - \lambda_n$) enters its add/drop system 218 at node A (240). The composite optical signal is separated into its component channels by the WDM 220. Each channel is then outputted to its own path 250-1 through 250-n. For example, $\lambda_1$ would travel along path 250-1, $\lambda_2$ would travel along path 250-2, etc. In the same manner, the composite optical signal from Loop 150 ($\lambda_1' - \lambda_n'$) enters its add/drop system 219 via node C (270). The signal is separated into its component channels by the WDM 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new composite optical signal by the WDM 230. The new signal is then returned to Loop 150 via node D 290. At the same time, $\lambda_1'$ is transferred from path 280-1 to path 250-1. It is combined with the others of Loop 110's channels into a single new composite optical signal by the WDM 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. This is the add/drop function.

FIG. 1b illustrates a second form by which add/drop systems 218 and 219 may be configured. In FIG. 1b, each WDM is optically coupled to a first plurality of paths through which channels are outputted and to a second plurality of paths through which signals are inputted. For instance, the paths 250-1, 250-2, . . . , 250-n are utilized to output signals comprising wavelengths $\lambda_1, \lambda_2, \ldots, \lambda_n$, respectively, from the WDM 220 and the paths 251-1, 251-2, . . . , 251-n are utilized to input signals comprising such wavelengths to the WDM 220. Likewise, as shown in FIG. 1b, the paths 280-1, 280-2, . . . , 280-n are utilized to output signals $\lambda_1', \lambda_2', \ldots, \lambda_n'$ (comprising the physical wavelengths $\lambda_1, \lambda_2, \ldots, \lambda_n$) respectively, from the WDM 230 and the paths 281-1, 281-2, . . . , 281-n are utilized to input signals comprising such wavelengths to the WDM 230.

FIGS. 2a and 2b illustrate a top view and side view, respectively, of a prior-art grating-based WDM. In the WDM 200, a concave reflection-type holographic grating 202 is disposed upon a substrate plate or block 201 comprised of a material with low thermal expansion. The grating 202, which comprises a portion of a spherical surface 206 centered at point 210, receives a wavelength-division multiplexed composite optical signal 211 input to the WDM 200 from an input fiber 204. The composite optical signal 211 is comprised of a plurality of individual channels, $\lambda_1, \lambda_2, \ldots$. The concave grating 202 diffracts, reflects, focuses and spatially disperses each of these individual channels according to its respective wavelength such that each channel is directed to exactly one of a plurality of output fibers 209a–209b. For instance, referring to FIG. 2a, if input signal 211 is comprised of two channels, namely channel $\lambda_1$ (207a) and channel $\lambda_2$ (207b), with $\lambda_1 > \lambda_2$, then, upon back-diffraction from grating 202, the $\lambda_1$ channel (207a) and the $\lambda_2$ channel (207b) are focused onto the end of fiber 209a and fiber 209b, respectively. input fiber 204 and the plurality of output fibers 209a–209c are disposed within an array 205 of fibers. The end faces of the fibers in array 205 are disposed along or parallel to a plane 208 which makes an angle of 60° with the line 203 that is normal to the grating 202 at the center of the grating 202. With this disposition, the grating 202 diffracts light according to the Littrow configuration, in which the angles of incidence and diffraction are approximately equal. FIG. 2b shows a side view of the prior art apparatus taken parallel to the fiber 204. FIG. 2b shows that the fibers are directed towards the grating vertex and are at an angle to the grating dispersion plane 215. The input fiber 204 and the output fibers 209a–209c each make the same angle φ (taken without regard to algebraic sign) with respect to the dispersion plane 215 and the input fiber 204 makes an angle of 2φ with respect to the plane of the output fibers. With channels spaced at 0.33 nm, fiber-to-fiber losses within the WDM 200 can be maintained at less than 1 dB and ultra-low crosstalk can be maintained.

For use in commercial optical communications systems, the WDM must limit polarization-dependent loss introduced by the diffraction grating. Polarization-dependent loss results in insertion loss, which compromises the reliability of data carried by the channels.

Accordingly, there exists a need for an improved grating-based wavelength division multiplexer (WDM). The grating-based WDM should provide very low polarization-dependent loss. The present invention addresses such a need.

SUMMARY OF THE INVENTION

The present invention provides an improved wavelength division multiplexer (WDM). The WDM includes a birefringent walk-off plate; a reciprocal optical rotator optically coupled to the birefringent plate; and a diffraction grating optically coupled to the reciprocal optical rotator at a side opposite to the birefringent plate. This grating-based WDM provides very low polarization-dependent loss, and therefore, greatly reduces insertion loss. This increases the reliability of the data carried by the channels.

DETAILED DESCRIPTION

The present invention provides an improved grating-based wavelength division multiplexer (WDM). The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. preferred embodiment of a WDM in accordance with the present invention comprises a birefringent walk-off plate, an optical rotator, an optional path length compensation plate, a lens, and a diffraction grating. To more particularly describe the features of the present invention, please refer to FIGS. 3a through 8e in conjunction with the discussion below.

Figure 3A:
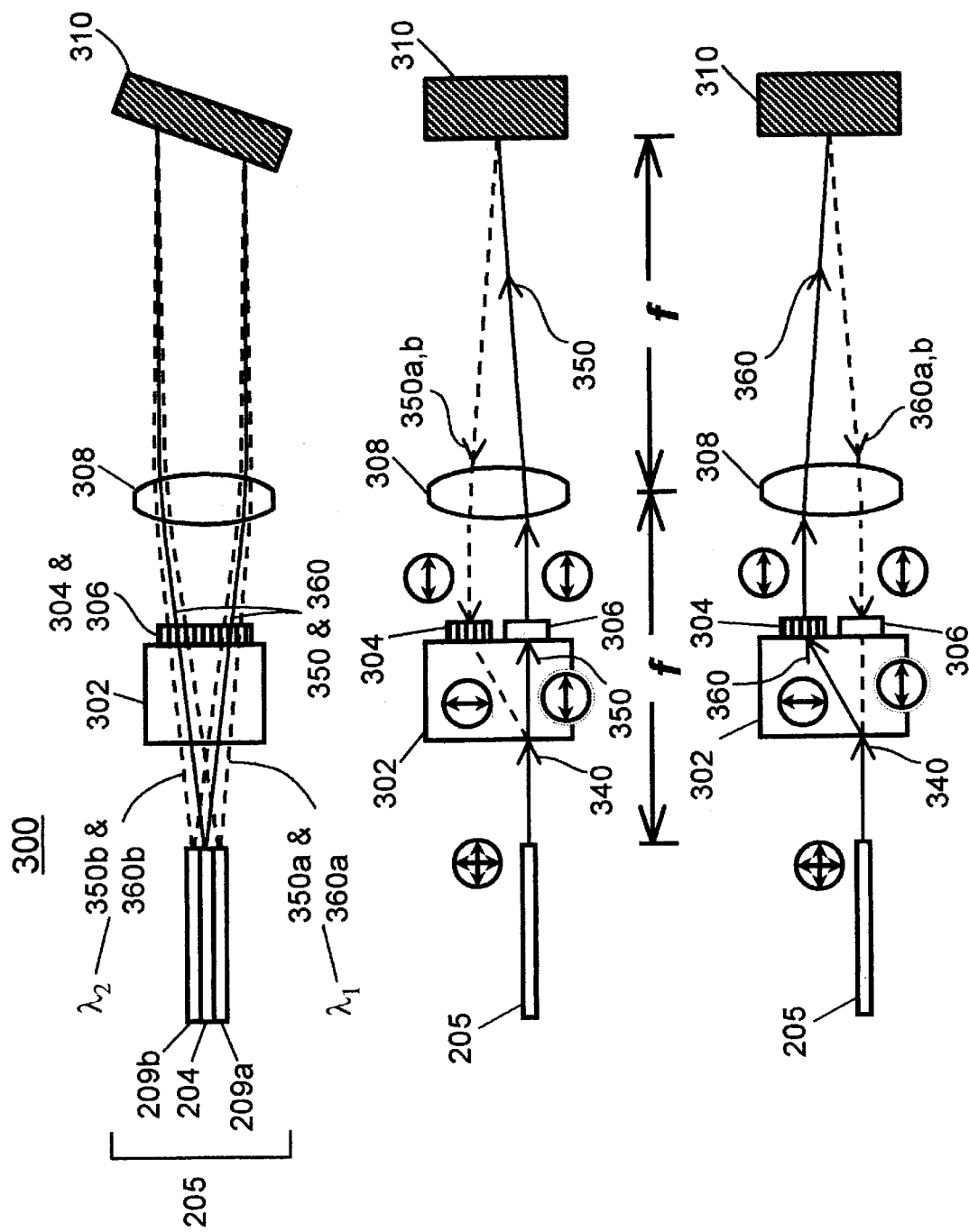
FIGS. 3a and 3b illustrate a first and a second preferred embodiment, respectively, of a grating-based WDM in accordance with the present invention.
Figure 3B:
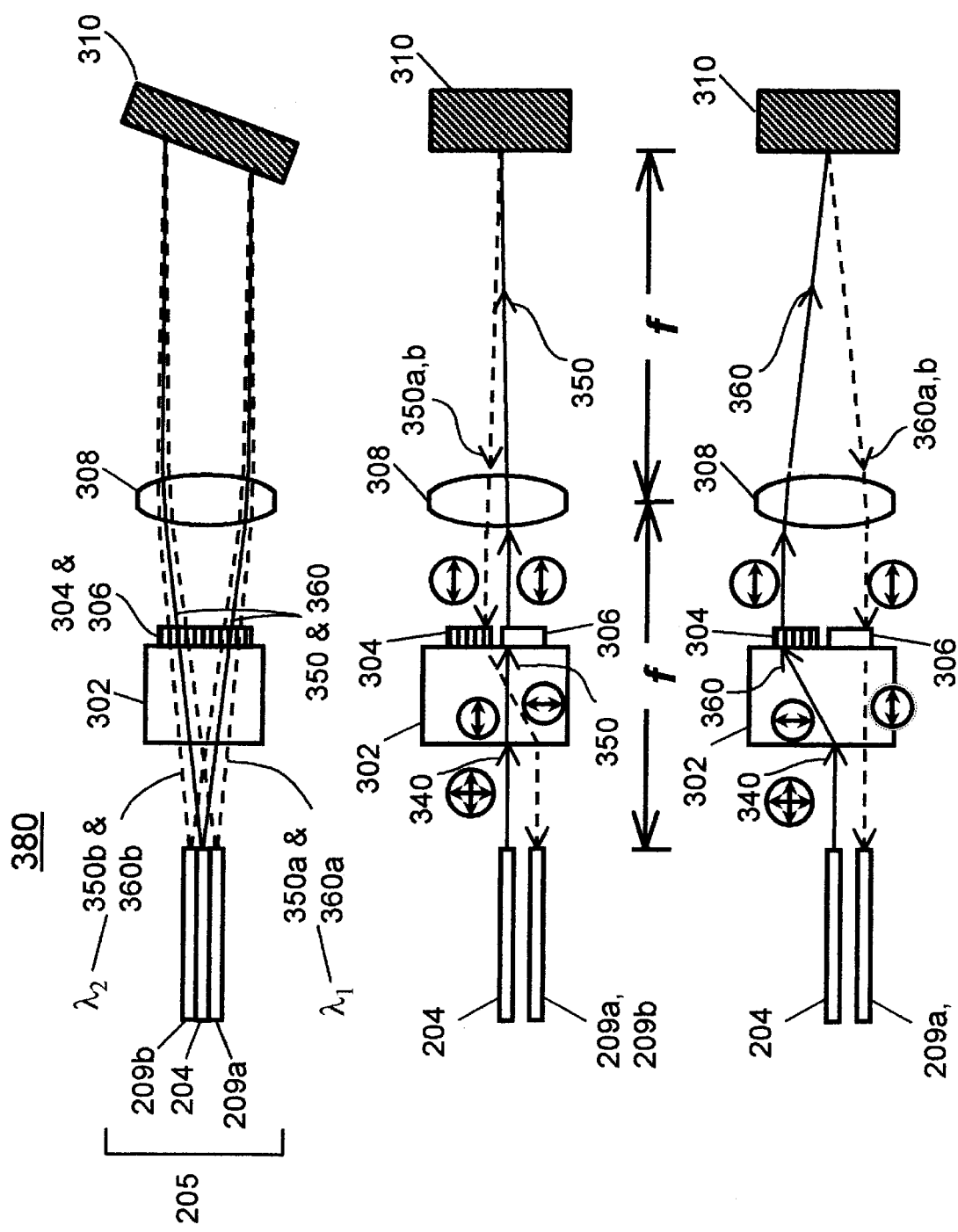

FIGS. 3a–3b illustrate a first and a second preferred embodiments, respectively, of the grating-based WDM in accordance with the present invention. The WDM 300 (FIG. 3a) and the WDM 380 (FIG. 3b) are designed so as to compensate for any polarization-dependent loss introduced by the diffraction grating 310. This compensation is accomplished by providing a WDM 300 whereby all signal light input to the grating 310 is linearly polarized in an orientation for which the grating 310 has maximum efficiency. Frequently, diffraction gratings possess maximum efficiency for light polarized with the "TM polarization", in which the electric vector of the light is perpendicular to the grating grooves. However, depending upon many factors, including the light wavelength, the grating groove spacing, etc., the grating efficiency is sometimes greater for light having the "TE polarization", in which the electric vector is parallel to the grating grooves.

If unpolarized light is input to a diffraction grating, then the component of the light having the optimal polarization will be diffracted with maximum efficiency, but a portion of the light component having non-optimal polarization will be lost as a result of the reduced diffraction efficiency for that component. However, the overall grating efficiency of the grating may be improved by converting all light to the polarization for which the grating efficiency is maximum. The WDMs 300, 380 illustrated in FIGS. 3a–3b accomplish such a polarization conversion. In the following discussion, it is assumed that the grating efficiency is maximum for TM polarized light and thus light is introduced to the grating 310 with such polarization. However, one of ordinary skill in the art will understand how to modify the WDM 300, 380 for use with a diffraction grating having maximum efficiency for light with TE polarization. Circles with horizontal and vertical double-barbed arrows adjacent to signal light paths respectively represent horizontal and vertical linear polarization of such signal lights as they propagate through the WDMs 300, 380 of FIGS. 3a–3b. Circles with two double-barbed arrows signify unpolarized, mixed polarized or randomly polarized light.

In each of the WDM 300 (FIG. 3a) and the WDM 380 (FIG. 3b), an array 205 of fibers is utilized for input and output of optical signals. The fiber array 205 comprises a first optical fiber 204 that carries, either as input or output, a wavelength division multiplexed composite optical signal and a plurality of second optical fibers 209a, 209b, . . . wherein each such fiber carries, either as output or input, a single signal comprising an individual wavelength. When the WDM 300 (380) is utilized as a de-multiplexer, the fiber 204 inputs a composite optical signal to WDM 300 (380) and the fibers 209a, 209b, . . . each output a single channel from WDM 300 (380). When the WDM 300 (380) is utilized as a multiplexer, the input and output roles of the fibers are reversed. Only the de-multiplexer operation is described in the following discussions.

In each of the WDM 300 and the WDM 380, the first fiber 204 and the plurality of second fibers 209a, 209b, . . . are optically coupled to a birefringent walk-off plate 302. The birefringent walk-off plate 302 has the property of causing a physical separation of light input thereto into two sub-lights of mutually orthogonal linear polarizations. This physical separation is illustrated for an input composite optical signal 340 in the two lower drawings of each of FIG. 3a and FIG. 3b, which present side views of the WDM 300 (FIG. 3a) and the WDM 380 (FIG. 3b). The birefringent walk-off plate 302 is further optically coupled to both a 90° reciprocal optical rotator 304 and an optional optical path length compensation plate 306 disposed to the opposite side of walk-off plate 302 from the fiber array 205. The reciprocal optical rotator 304 is an optical element having the property of rotating, by 90 degrees, the plane of linear polarization of linearly polarized light passing completely therethrough. Such components are well-known in the art. A lens or lens assembly 308 is optically coupled to the optical rotator 304 and/or the compensation plate 306 and is disposed to the opposite side of elements 304–306 from the walk off plate 302. The lens or lens assembly 308 is disposed substantially at a distance d from the ends of the fibers in array 205, where $f$ is the focal length of lens or lens assembly 308. Finally, a diffraction grating 310 is optically coupled to the lens or lens assembly 308 at a distance d $f$ from lens or lens assembly 308 on the opposite side of the lens or lens assembly 308 from the optical rotator 304. The grating 310 is a reflection type diffraction grating and may be either flat (planar) or concave.

The two WDM 300 and 380 operate similarly to one another, both as multiplexers and de-multiplexers. Only the operation of WDM 300 as a de-multiplexer is described herein in detail. In such operation (FIG. 3a), a composite optical signal 340 comprised of unpolarized, randomly polarized or mixed polarized light is input to WDM 300 from the first fiber 204. The composite optical signal diverges as it leaves the fiber 204 and, upon through birefringent plate 302, is separated into a horizontally polarized composite optical signal 350 and a vertically polarized composite optical signal 360 as shown in the middle and bottom drawing of FIG. 3a, respectively. The vertically polarized composite optical signal 360 comprises a set of e-rays during its transit through walk-off plate 302 and is thus deflected or laterally offset by the well-known birefringent walk-off effect. The horizontally polarized composite optical signal 350 comprises a set of o-rays during its transit through walk-off plate 302 and is not deflected.

After passing through walk-off plate 302, the offset composite optical signal 360 passes through reciprocal optical rotator 304 and, therefore, the linearly polarized light comprising composite optical signal 360 experiences a 90° rotation of the orientation of its polarization plane. One or the other of the two composite optical signals 350 and 360 may also pass through the compensation plate 306. The compensation plate 306 adjusts the optical path length of the signal 350 (360) so as to match that of the signal 360 (350) but does not cause polarization plane rotation of light passing therethrough. After passing through the reciprocal optical rotator 304 and the compensation plate 306, the two composite optical signals 350 and 360 are similarly polarized in the horizontal direction so as to be perpendicular to the groove orientation of grating 310.

After passing through the reciprocal optical rotator 304 and/or the compensation plate 306, both composite optical signals 350 and 360 then pass through the lens or lens assembly 308. The lens or lens assembly 308 collimates the light of both signals and directs both signals onto the grating 310. Through diffraction, the grating 310 spatially separates and disperses the various channels comprising composite optical signals 350 and 360 according the their respective wavelengths. Because the "grooves" of grating 310 are disposed vertically, the dispersion plane of the grating 310 is disposed horizontally. The separated individual signals are propagated back towards and through the lens or lens assembly 308 as shown in the lower two drawings of FIG. 3a. The pathways of two such signals 350a and 350b separated from composite optical signal 350 are illustrated in the top two drawings of FIG. 3a; the pathways of two such signals 360a and 360b separated from composite optical signal 360 are illustrated in the upper and lower drawings of FIG. 3a. It is to be kept in mind that the signals 350a and 360a both comprise a first wavelength $\lambda_1$ and that the signals 350b and 360b both comprise a second wavelength $\lambda_2$ different from the first wavelength.

Because of the horizontal disposition of the dispersion plane of the grating 310, the pathways of the signals 350a and 360a, comprising a first wavelength $\lambda_1$ are separated within a horizontal plane (top diagram of FIG. 3a), from the pathways of the signals 350b and 360b, comprising a second wavelength $\lambda_2$. However, in the side-view projections of FIG. 3a, the reverse propagation pathways of signals 350a–350b overlap the forward propagation pathway of composite optical signal 360 and the reverse propagation pathways of signals 360a–360b overlap the forward propagation pathway of composite optical signal 350. The returning signals 350a–350b and 360a–360b are all caused to converge by lens 308 upon passing through the lens 308 in the return direction. This convergence and wavelength dispersion by grating 310 are such that all rays of a given wavelength are caused to come to a focus at the end of a respective one of the fibers 209a–209b. After passing through lens 308, these converging signal rays pass through the reciprocal optical rotator 304 and, optionally, the compensation plate 306.

Upon passing through the reciprocal optical rotator 304, the polarization planes of the lights comprising signals 350a–350b are rotated by 90° so as to become vertical. These vertically polarized signals 350a–350b then comprise e-rays within the birefringent walk-off plate 302 and are thus deflected or offset upon passing therethrough. The lights comprising signals 360a–360b do not pass through the reciprocal optical rotator 304 and thus the polarized lights of which they are comprised do not incur rotations of their polarization planes. These horizontally polarized lights thus pass through walk-off plate 302 as undeflected o-rays.

The offset, within the vertical dimension, of the signals 350a–350b (middle drawing of FIG. 3a) is exactly equal and opposite to that of the forward propagating composite optical signal 360 (lower drawing of FIG. 3a), which is separated into the signals 360a–360b. Therefore, the signals 350a and 360a, comprising the same wavelength $\lambda_1$, become combined into one signal upon passing through walk-off plate 302 and likewise for the signals 350b and 360b, comprising the same wavelength $\lambda_2$. These combined signals comprising wavelengths $\lambda_1$ and $\lambda_2$ then focus onto the output fiber 209a and the output fiber 209b, respectively. The focusing is accomplished by the focusing properties of the lens or lens assembly 308. In this fashion, the WDM 300 functions as a de-multiplexer.

Because, in the WDM 300, the first or input fiber 204 is co-planar with the plurality of second or output fibers 209a, 209b, . . . , the WDM 300 will, in general, have the undesirable effect of returning one particular channel or wavelength back to the input fiber 204. To avoid this effect, the wavelength in question may be chosen so as to not correspond to any channel, or else an optical isolator or optical circulator (not shown) may be optically coupled to the fiber 204 so as to separate the forward propagating input signal(s) from the reverse propagating output signal(s). Alternatively, the WDM 380 in FIG. 3b may be employed. The WDM 380 generally is constructed and operates similarly to the WDM 300 (FIG. 3a) except that the first fiber 204 is displaced, in the vertical dimension, from the horizontal plane of the plurality of second fibers 209a, 209b, . . . . The first or input fiber 204 is vertically displaced relative to one of the second or output fibers, for instance, fiber 209c (not shown). In this fashion, the wavelength that would otherwise be returned to fiber 204, in WDM 300, for instance, is returned to the fiber 209c.

FIGS. 4 through 8e illustrate a preferred embodiment of a concave holographic diffraction grating with a packaging used in the WDM in accordance with the present invention. This grating packaging is disclosed in co-pending U.S. Patent Application entitled, "Packaging For Grating-Based WDM Router", Ser. No. 09/579,208, filed on Oct. 26, 2001. Applicants hereby incorporate this patent application by reference. Although FIGS. 4–8e illustrate the preferred embodiment as utilizing a concave holographic diffraction grating, it is not intended that the grating 310 be limited to a concave shape or a holographic construction. For instance, the grating 310 might be planar in shape or might comprise a surface with a grooved or ruled structure.

Figure 4:
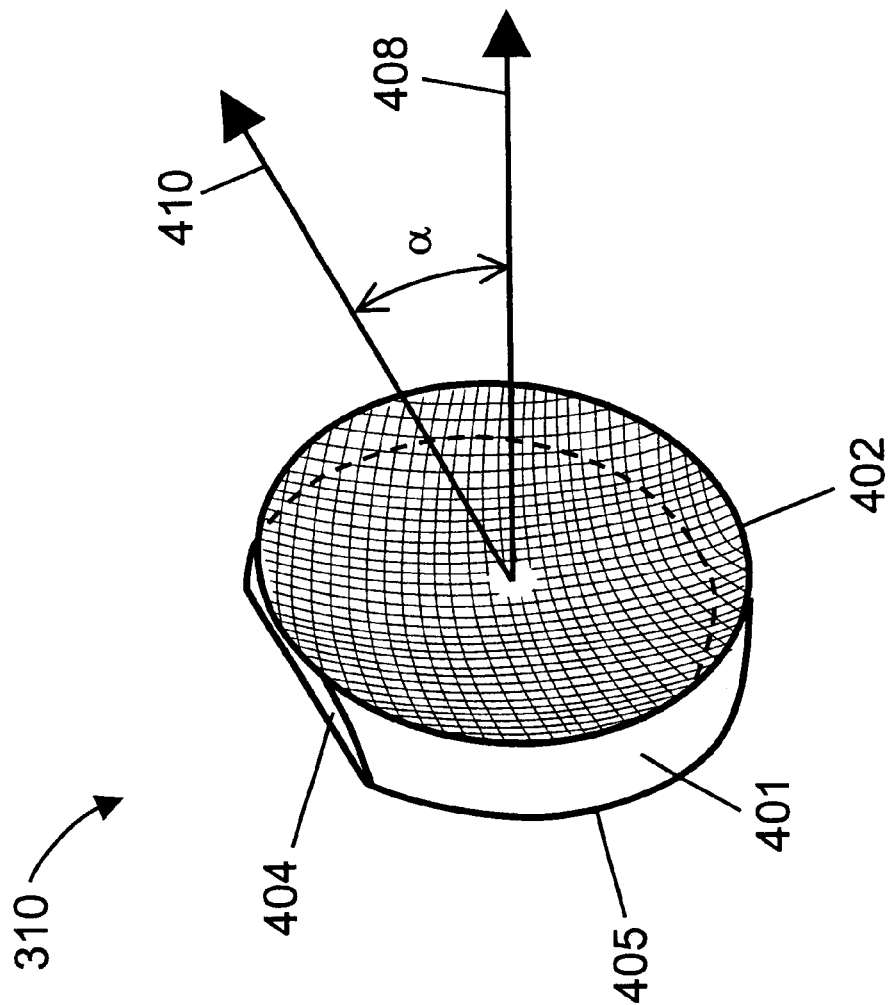
FIG. 4 illustrates, in perspective view, a concave holographic grating block of a diffraction grating and packaging used in the grating-based WDM in accordance with the present invention.

FIG. 4 illustrates, in perspective view, a concave holographic grating block of the grating packaging used in the WDM in accordance with the present invention. The grating block 310 comprises a diffraction grating 402 disposed on the concave surface of a substrate plate 401. The grating 402 comprises a reflective concave surface or film in the geometric form of a spherical cap. The grating axis 408 is perpendicular to the chord to spherical cap grating surface 402 at the center of this surface. The back surface 405 of substrate plate 401 is opposite to the grating surface 402. An alignment surface 404 is formed or cut within substrate plate 401 at an oblique angle with respect to the grating surface 402.

A plurality of holographically formed grooves or Bragg diffraction surfaces is disposed upon or within the grating 402. The grooves or Bragg surfaces comprise the light scattering elements of grating 402 and represent an interference fringe pattern produced using the well-known technique of holography. The grooves or Bragg surfaces of grating 402 are disposed such that the grating 402 operates in the Littrow configuration—that is, such that light rays delivered to the grating 402 and light rays diffracted from the grating 402 are substantially parallel to a single Littrow axis 410 disposed at a particular angle α to the grating axis.

Figure 5:
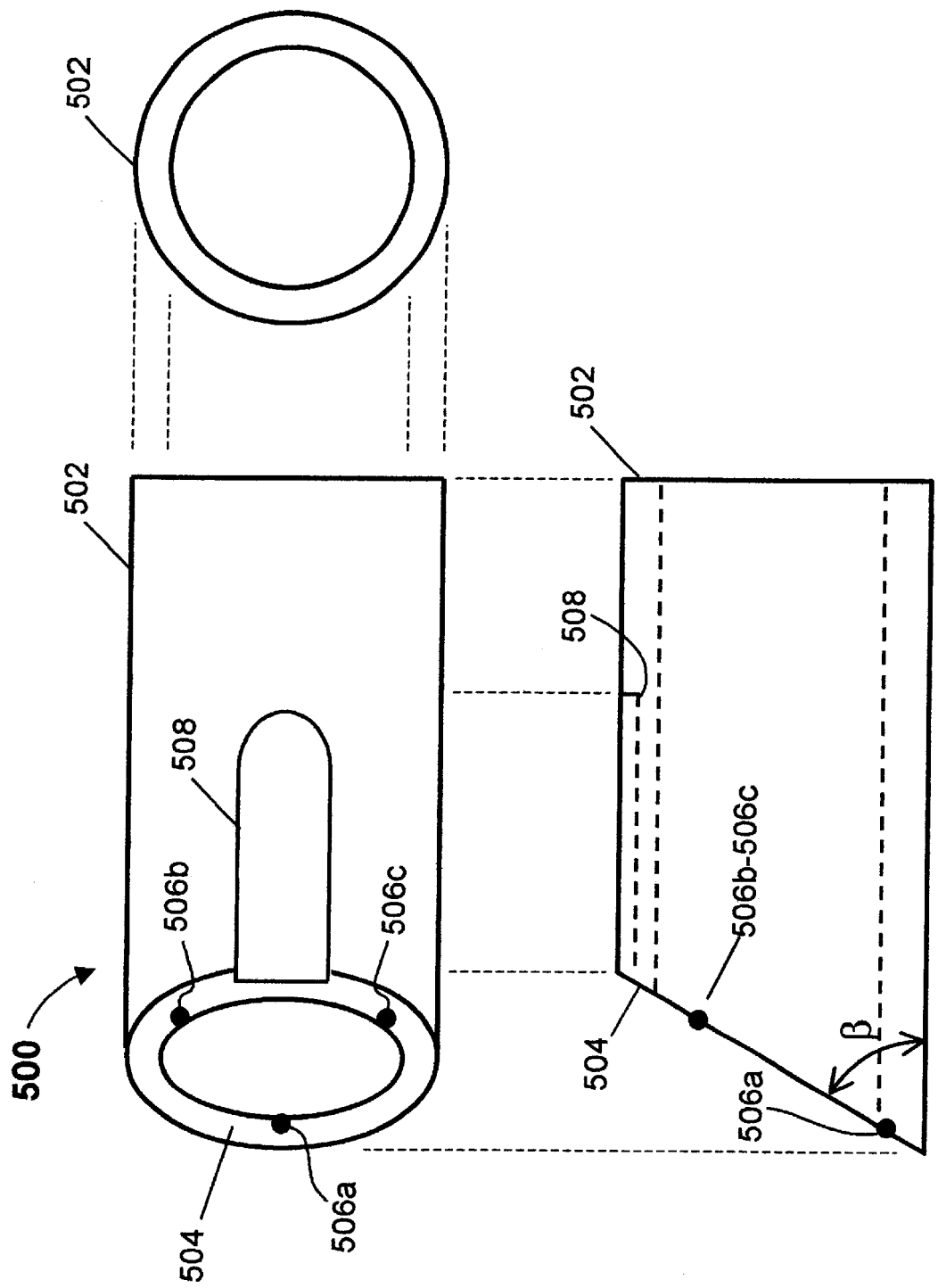
FIG. 5 illustrates a grating mounting block utilized in conjunction with the concave holographic grating of the grating packaging used in the WDM in accordance with the present invention.

FIG. 5 illustrates a grating mounting block utilized in conjunction with the concave holographic grating of the grating packaging used in the WDM in accordance with the present invention. The mounting block 500 comprises a hollow rod 502. A slanted surface 504 is cut or formed at one end of rod 502 and carries a plurality of rounded mounting pins or mounting balls 506a–506c. In the preferred embodiment, three mounting pins are used. The slant angle β that the surface 504 makes with the axis of the rod 502 is substantially equal to the complement of the angle of incidence of input signal light rays delivered to the grating 402 in Littrow configuration. Further, a groove or slot 508 is cut or formed on the outer side surface of hollow rod 502.

Figure 6:
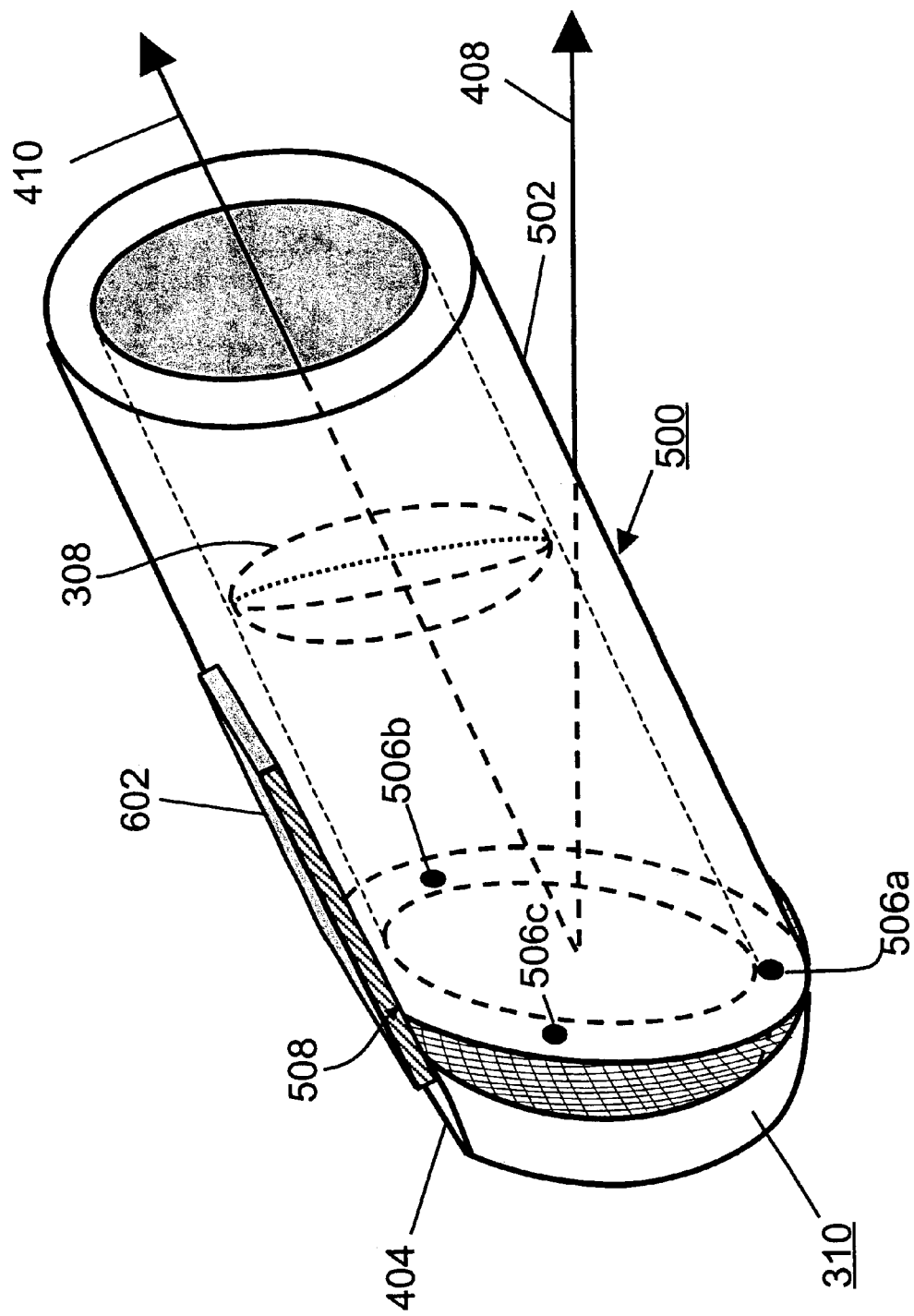
FIG. 6 illustrates a perspective view of a concave holographic grating disposed adjacent to a grating mounting block of the grating packaging used in the WDM in accordance with the present invention.

FIG. 6 illustrates a perspective view of a concave holographic grating 310 disposed to a grating mounting block of the grating packaging used with the WDM in accordance with the present invention. The three rounded mounting pins 506a–506c comprise the sole contact points between the grating surface 402 and the mounting block 500. A rotational alignment pin or plate 602 is disposed so as to contact both the alignment surface 404 of grating block 400 and the slot 508 of hollow rod 502. The rotational alignment pin or plate 602 locks the rotational alignment of grating surface 402 such that the Littrow axis 410 is substantially parallel to the long axis of hollow rod 502. The alignment plate 602 is secured to rod 502 by adhesive, epoxy, solder, or the like. The lens 308 is preferably secured within the hollow rod 502 at a distance $f$ from the grating 310, where $f$ is the focal length of lens 308.

Figure 7:
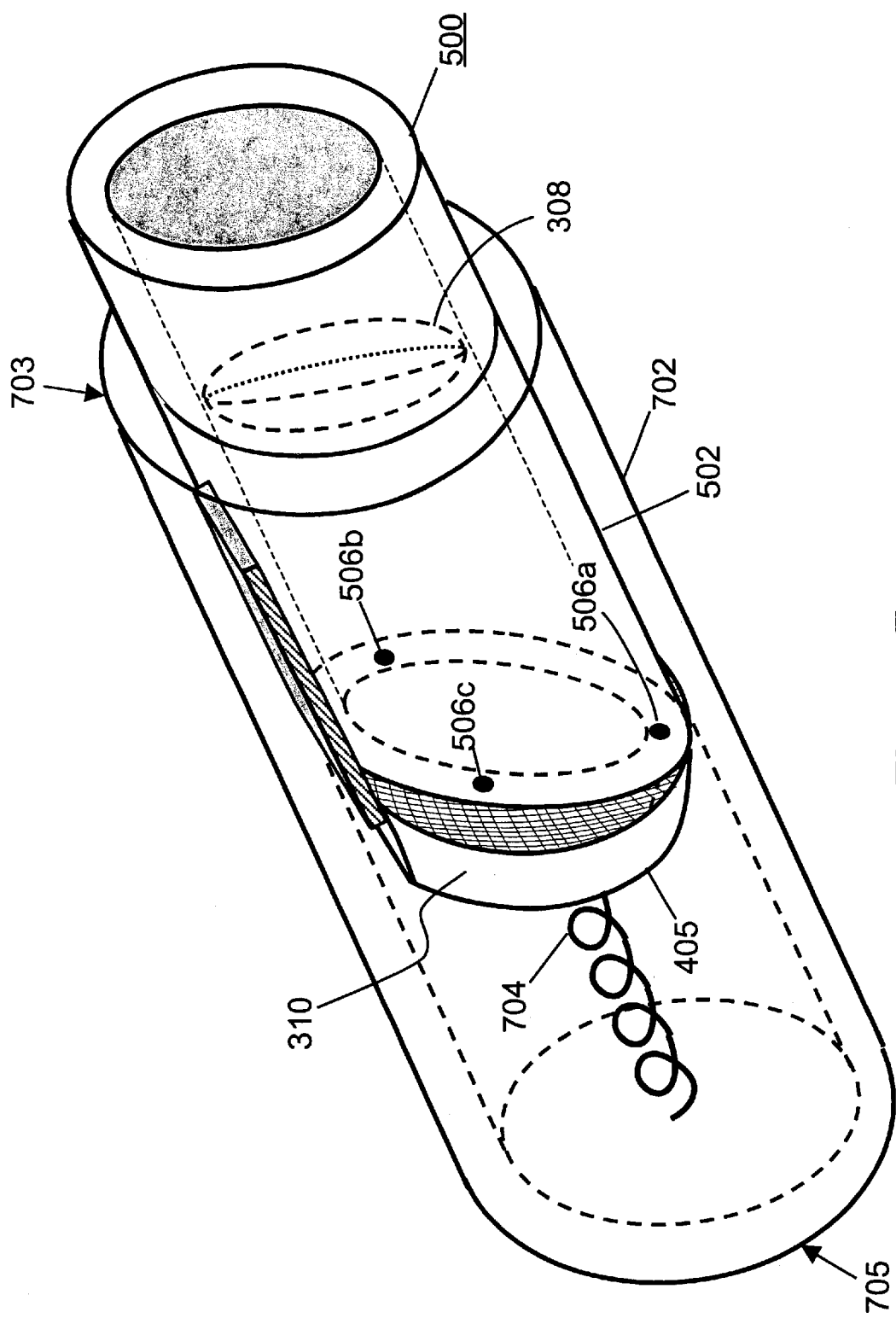
FIG. 7 illustrates further details of the assembly and alignment of the grating block of the grating packaging used in the WDM in accordance with the present invention.

FIG. 7 illustrates further details of the assembly and alignment of the grating block within the grating packaging used in the WDM in accordance with the present invention. The grating block 310 is housed within an outer protective tube or sleeve 702. The sleeve 702 is open only at its front end 703 and is sealed at its back end 705. The inner diameter of the sleeve 702 is large enough to fit over at least a portion of the hollow rod 502. A holding mechanism 704 housed within the sleeve 702 applies force to the back face 405 of grating block 310. In the preferred embodiment, the holding mechanism 704 is spring-loaded. This force is such that, when sleeve 702 is fitted over rod 502, the spring mechanism 704 forces the grating block 400 into its proper alignment against the pins 506a–506c and the alignment plate 602.

Figure 8A:
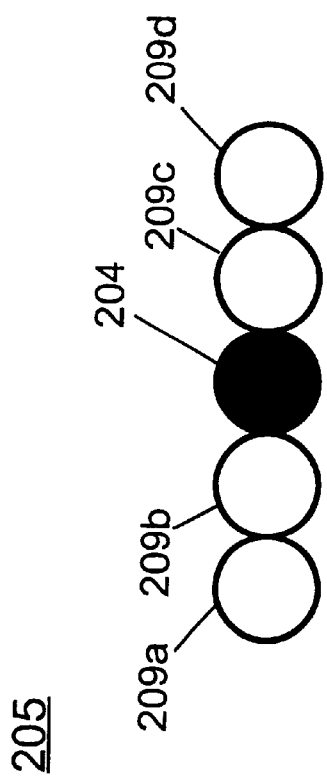
FIGS. 8a and 8b illustrate end views of input and output fibers in two possible configurations of a fiber array of the grating packaging used in the WDM in accordance with the present invention.
Figure 8B:
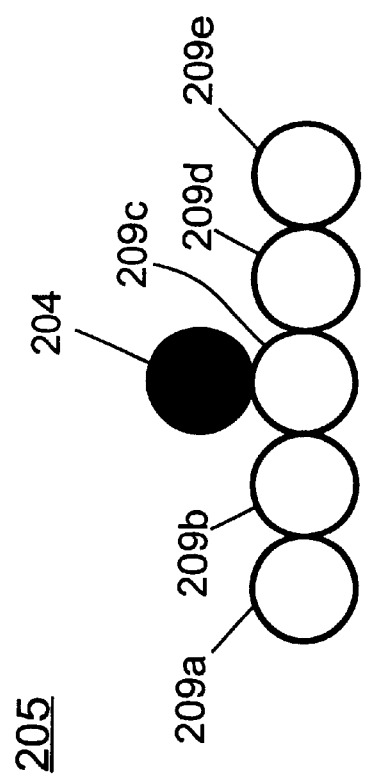

FIGS. 8a and 8b illustrate end views of input and output fibers in two possible configurations of a fiber array of the grating packaging used in the VVDM in accordance with present invention. The fiber configuration illustrated in FIG. 8a is utilized in WDM 300 (FIG. 3a) whereas that illustrated in FIG. 8b is utilized in WDM 380 (FIG. 3b). In both FIG. 8a and FIG. 8b, fiber 204 is an input/output fiber that carries, either as input or output, a wavelength division multiplexed composite optical signal and fibers 209a–209e are a plurality of output/input fibers wherein each such fiber carries, either as output or input, a single signal comprising an individual wavelength.

Figure 1A:
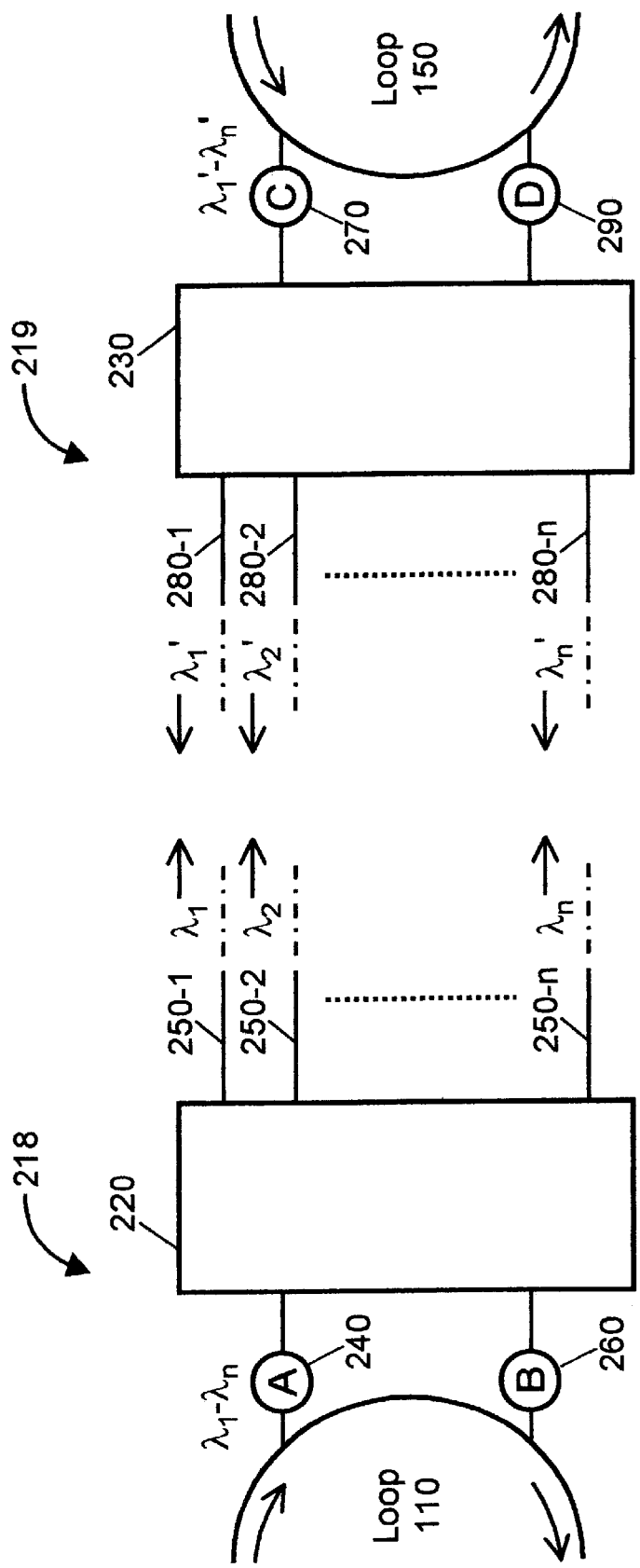
FIG. 1a and FIG. 1b illustrate two configurations of conventional add/drop systems utilizing wavelength division multiplexers (WDM).
Figure 1B:
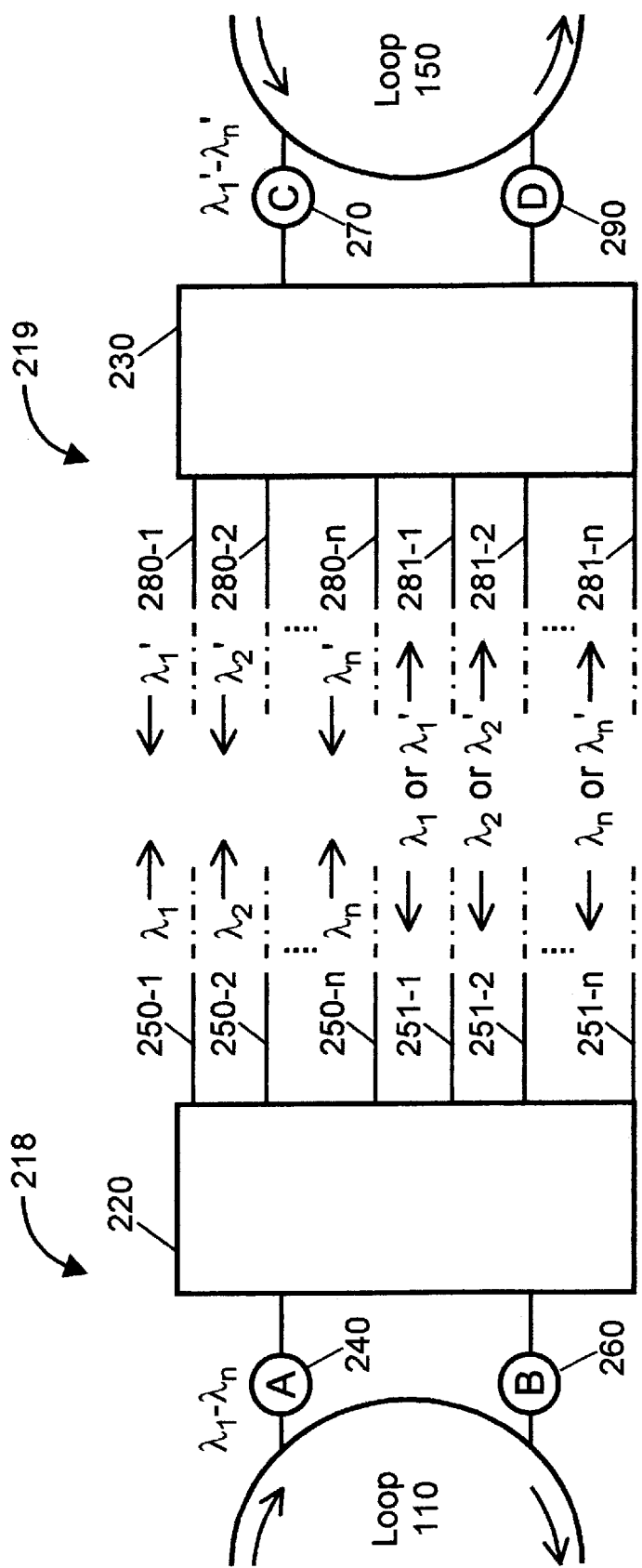
Figure 2A:
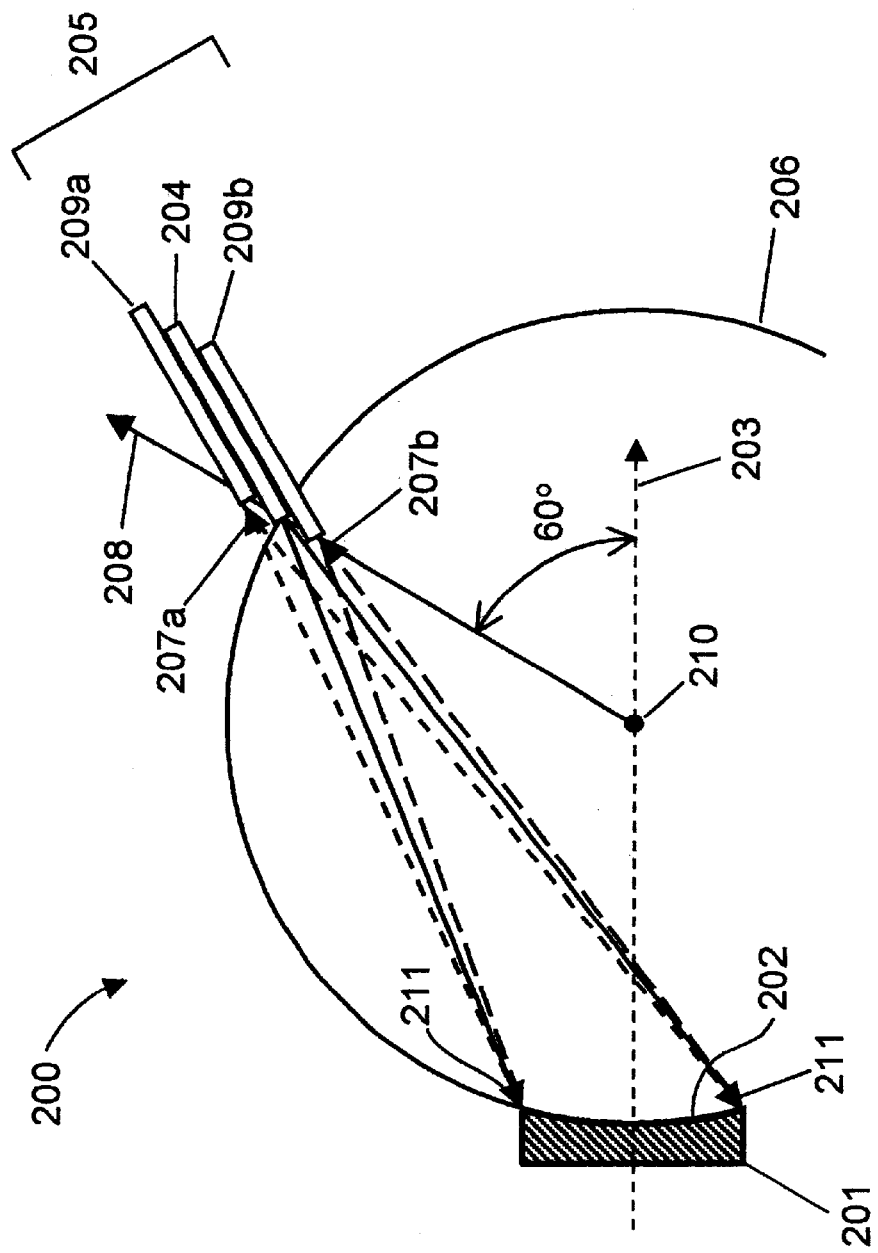
FIGS. 2a and 2b illustrate a top and a side view, respectively, of a prior-art grating-based WDM employing a concave holographic grating in stationary anastigmatic Littrow configuration.

In the embodiment of fiber array 205 shown in FIG. 8a, the fibers 204, 209a–209d are all disposed within a single plane that is parallel to the grating dispersion plane. In the embodiment of the fiber array 205 shown in FIG. 8b, the fibers 209a–209e are all disposed within a plane that is at an angle φ (>0) with respect to the dispersion plane of grating 402 and the fiber 204 is to the opposite side of the dispersion plane and is disposed at an angle of −φ (<0) with respect to the dispersion plane. The centers of the end faces of all fibers are disposed within the plane 208 (FIG. 2a) in either fiber array configuration.

As a de-multiplexer, a wavelength division multiplexed composite optical signal is input to the WDM through input/output fiber 204, the composite optical signal is separated into its individual component signals by the grating 402, the separated signals are spatially dispersed by the grating 402 according to their respective wavelengths, and each individual signal is directed and focused onto a different respective fiber of the plurality of output/input fibers 209a–209d. The individual signals are then output from the WDM along respective individual output/input fibers of the set 209a–209d. In a multiplexer operation, individual signals are input to the WDM from respective individual fibers of the plurality of output/input fibers 209a–209d, the signals are diffracted by the grating 402 along a single direction so as to be combined into a single composite optical signal and the composite optical signal is focused onto the end of the input/output fiber 204 so as to be output from the WDM therein.

Figure 2B:
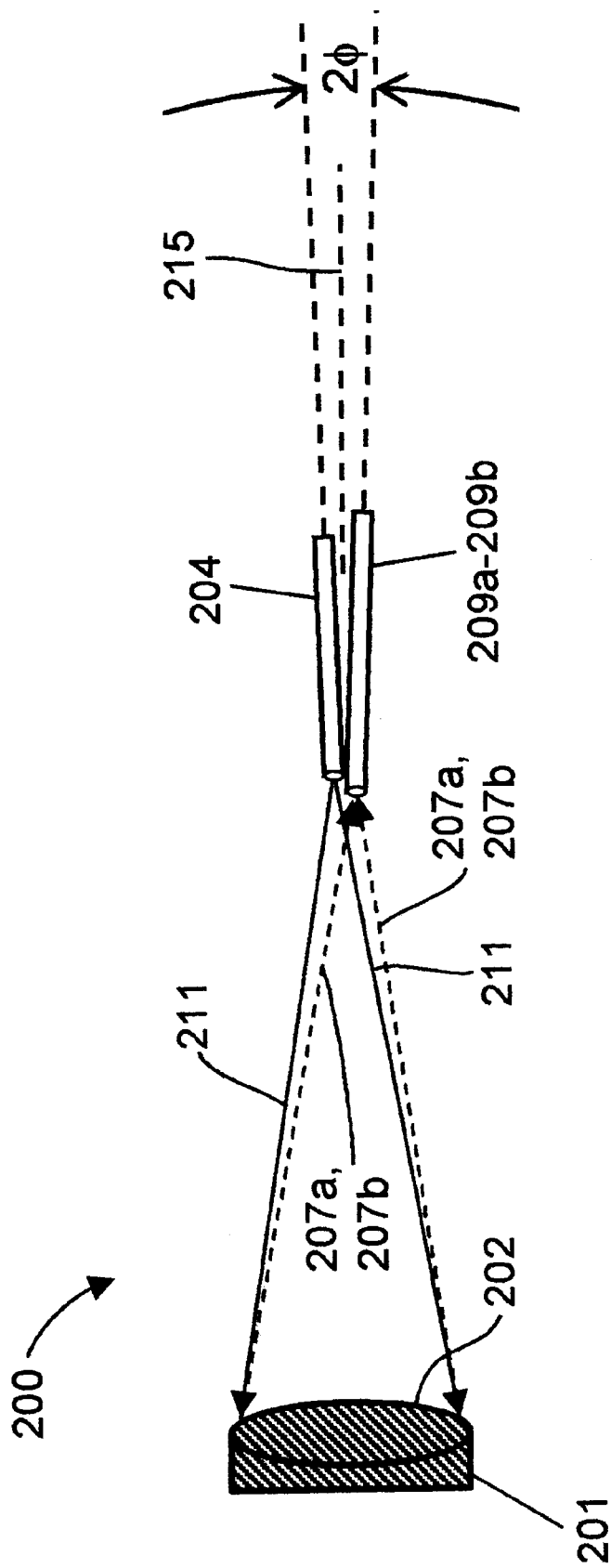
Figure 8C:
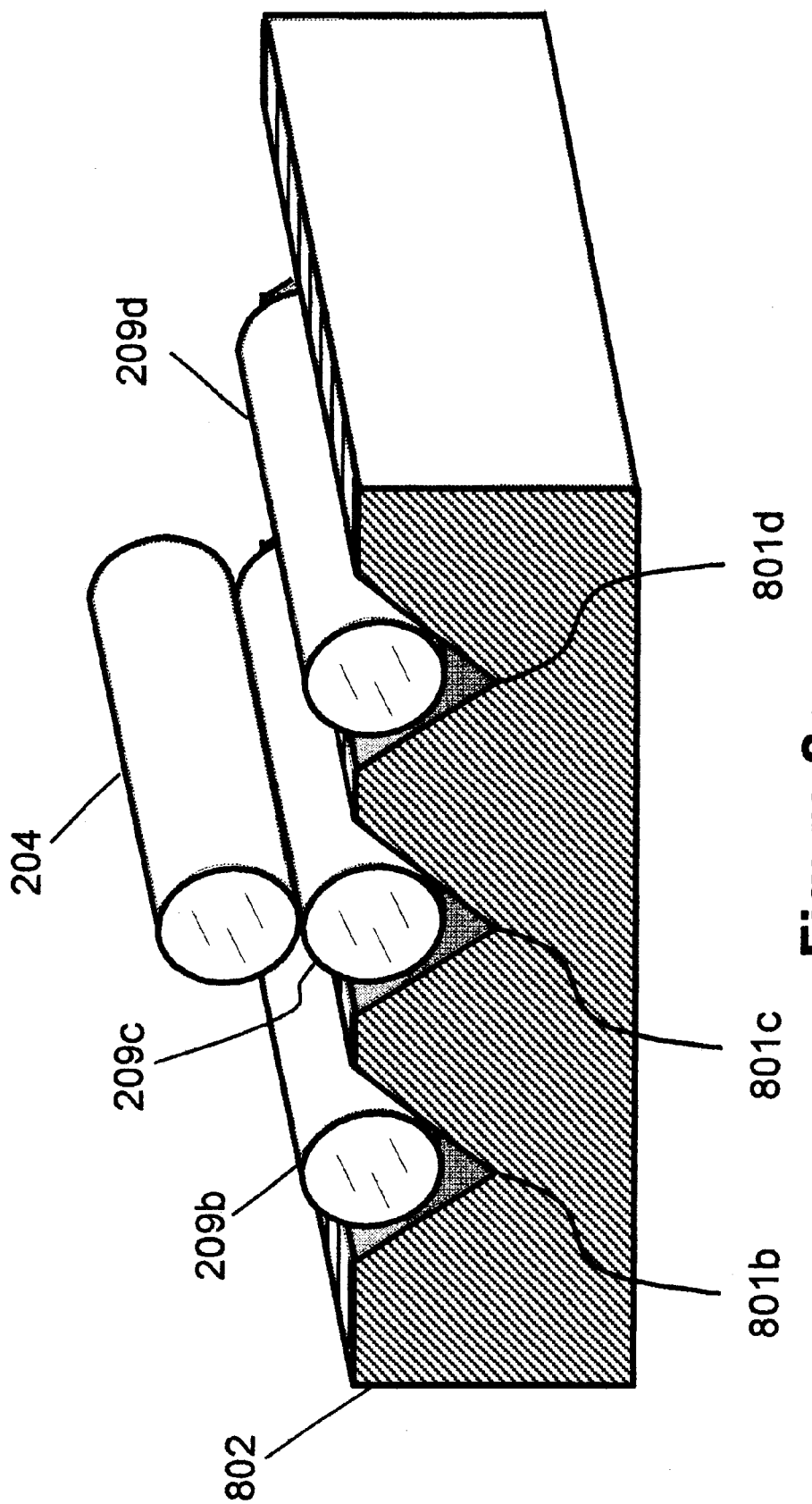
FIG. 8c illustrates the precise alignment of fibers in the grating packaging used in the WDM in accordance with the present invention.

FIG. 8c illustrates the precise alignment of fibers in one configuration of the grating packaging used in the WDM in accordance with the present invention. The fibers 209b–209d are disposed within a set of V-grooves 801b–801d, pre-cut or pre-formed within a face of the fiber alignment block 802, preferably using well-known photolithographic masking and etching processes. The fiber 204 is disposed out of the plane of the set of fibers 209b–209d and is held securely in place by an opposing pressure plate, by a set of adjacent non-light transmitting fibers, or by some other securing mechanism (not shown). The long axis of fiber 204, in general, makes an angle of 2φ with respect to that of the fiber with which it is in contact (FIG. 2b), where the situation in which 2φ=0 is also permitted (FIG. 8c).

Figure 8D:
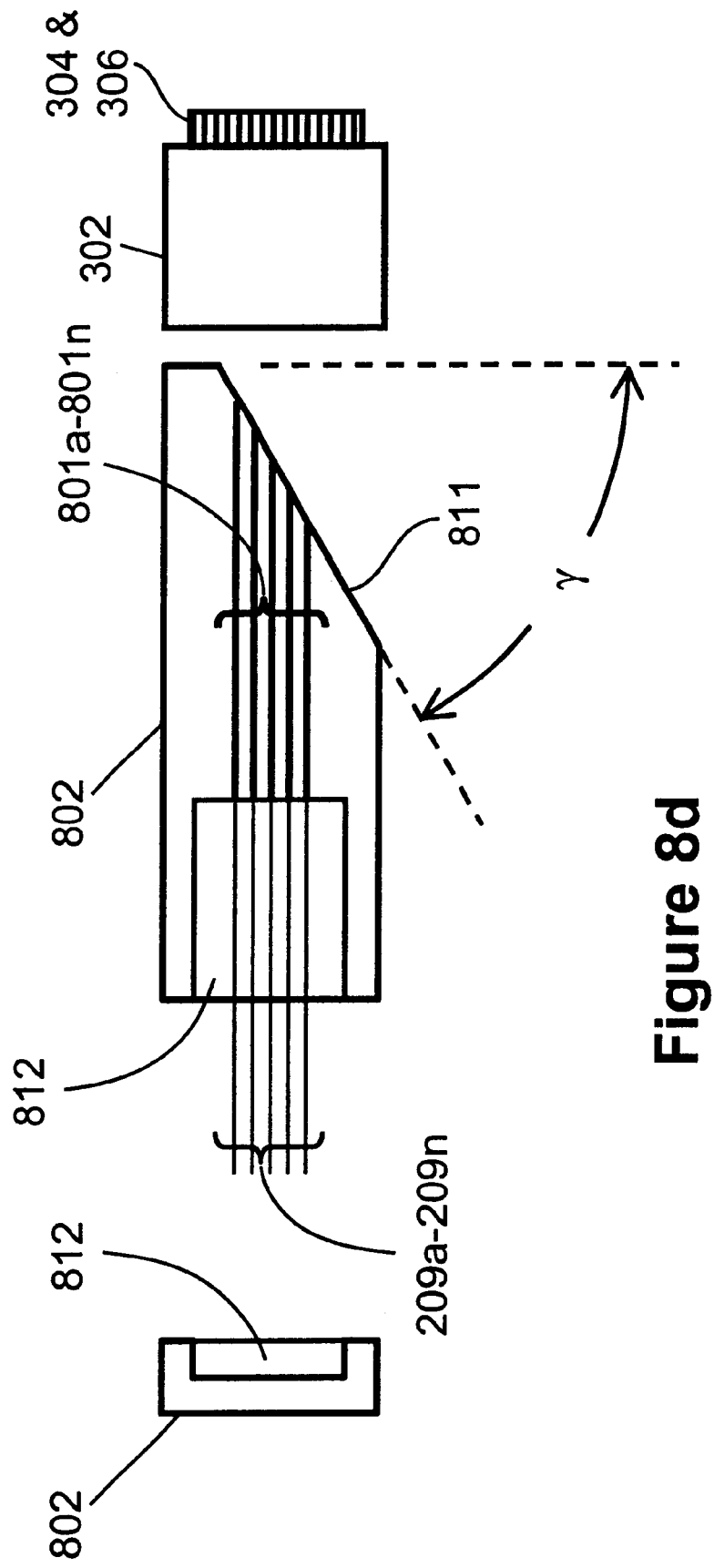
FIG. 8d illustrates an end view and a top view of the fiber alignment block of the grating packaging used in the WDM in accordance with the present invention.

FIG. 8d illustrates an end view and a top view of the fiber alignment block of the grating packaging used in the WDM in accordance with the present invention. Each one of the set 209a–209n of fibers is disposed within a respective one of the V-grooves 801a–801n. The fibers are securely held in place within the V-grooves by epoxy or other adhesive and/or by a pressure plate (not shown) such that the fibers comprising a single plane are parallel to the top face of the fiber alignment block 802. One end face 811 of the fiber alignment block 802 may be cut at an angle to facilitate correct focusing of each of the various channels into their respective output fiber. The end faces of the fibers of set 209a–209n are disposed in alignment with the face 811. In operation, the end face 811 faces the lens 308 and the block 310. The birefringent walk-off plate 302, reciprocal optical rotator 304 and optional path length compensation plate 306 are disposed between the end face 811 and the lens 308. A recess 812 is disposed at the opposite end of the fiber alignment block 802 from face 811 to provide strain relief for the fibers.

Figure 8E:
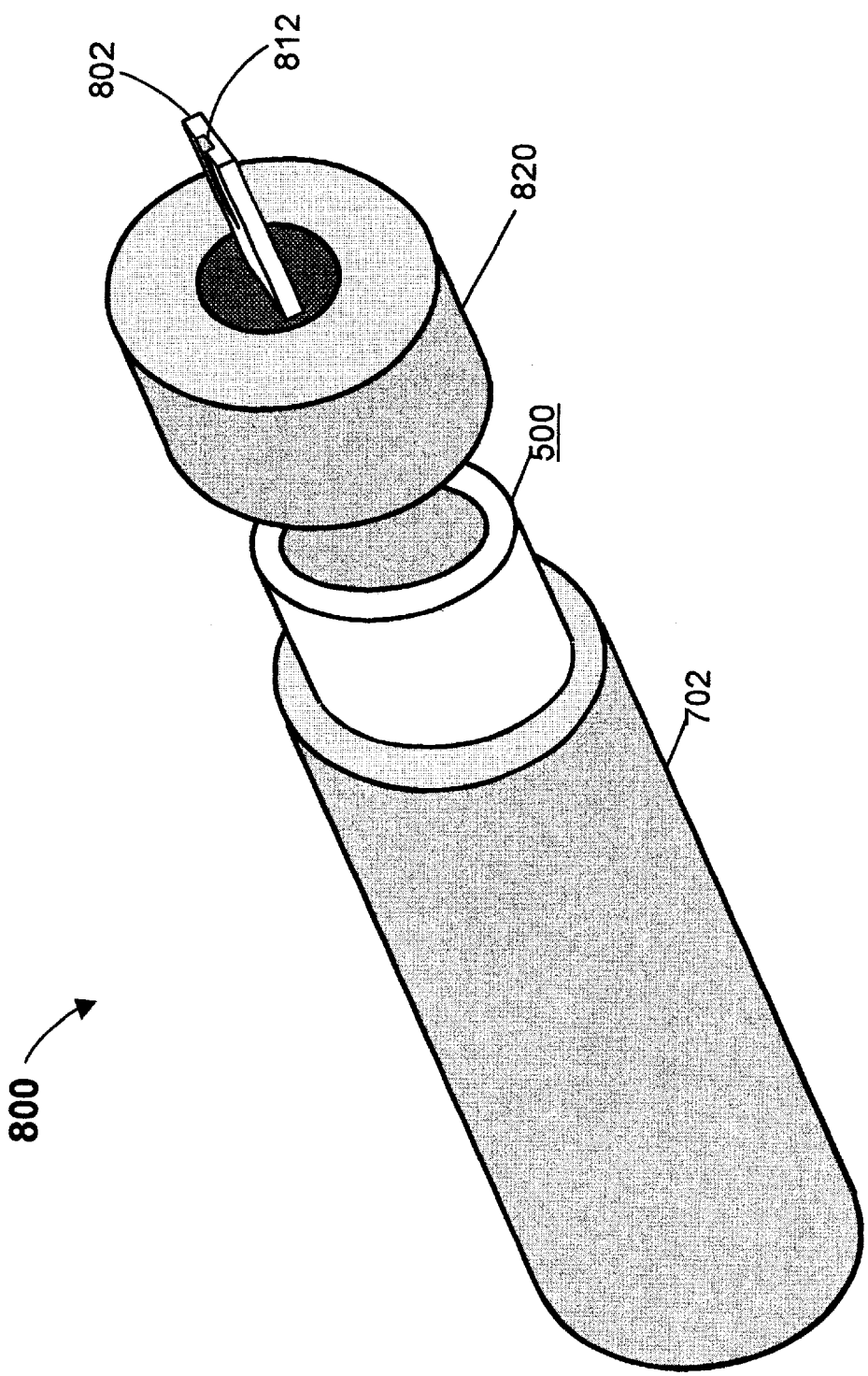
FIG. 8e illustrates a perspective view of the assembled grating packaging used in the WDM in accordance with the present invention.

FIG. 8e illustrates a perspective view of the assembled grating packaging used in the WDM in accordance with the present invention. The fiber alignment block 802 is positioned within an end cap 820 such that the angled face 811 of the block 802 and the ends of the fibers of set 205 face towards the grating block 310. The end cap 820 provides freedom for lateral and angular adjustment of the disposition of the plane of the top face of the fiber alignment block 802. The fiber alignment block 802 is secured to the end cap 820 by epoxy, solder, or other securing mechanism or adhesive. The end-cap 820 is secured to the sleeve 702 at a position such that the fibers disposed at a distanced $f$ from the lens 308. The final package is thereby hermetically sealed to protect the internal parts from environmental stresses or changes.

Although the preferred embodiment of the grating-based WDM has been described with the grating packaging illustrated in FIGS. 4–8e, one of ordinary skill in the art will understand that other gratings utilized in Littrow configuration may be used by the WDM without departing from the spirit and scope of the present invention.

An improved grating-based wavelength division multiplexer has been disclosed. A preferred embodiment of the WDM comprises a birefringent walk-off plate, an optical rotator, an optional path length compensation plate, a lens, and a diffraction grating. This grating-based WDM provides very low polarization-dependent loss, and therefore, greatly reduces insertion loss. This increases the reliability of the data carried by the channels.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A wavelength division multiplexer (WDM), comprising:
   a birefringent plate, wherein the birefringent plate separates a composite optical signal into a first sub-light and a second sub-light, wherein the first and second sub-lights have mutually orthogonal linear polarizations;
   a reciprocal optical rotator optically coupled to the birefringent plate, wherein the reciprocal optical rotator rotates a polarization plane of the first sub-light; and
   a diffraction grating optically coupled to the reciprocal optical rotator at a side opposite to the birefringent plate, wherein the diffraction grating spatially separates the first sub-light into a first signal and a third signal, and the second sub-light into a second signal and a fourth signal, wherein the first and third signals comprise a first wavelength, and the second and fourth signals comprise a second wavelength,
   wherein the diffraction grating reflects the first, second, third, and fourth signals to toward the reciprocal optical rotator and the birefringent plate,
   wherein the reciprocal optical rotator rotates a polarization plane of the first and second signals,
   wherein the birefringent plate combines the first and third signals, and combines the second and fourth signals.

2. The WDM of claim 1, further comprising:
   a fiber array optically coupled to the birefringent plate at a side opposite to the reciprocal optical rotator; and
   a lens optically coupled between the reciprocal optical rotator and the diffraction grating.

3. The WDM of claim 2, wherein the fiber array comprises:
   at least one input fiber; and
   a plurality of output fibers.

4. The WDM of claim 3, wherein the at least one input fiber is co-planar with the plurality of output fibers.

5. The WDM of claim 3, wherein the at least one input fiber is displaced from the plane of the plurality of output fibers.

6. The WDM of claim 2, wherein the lens is located from the fiber array at a length equal to a focal length of the lens.

7. The WDM of claim 1, wherein the reciprocal optical rotator is a 90 degree reciprocal optical rotator which rotates a polarization plane of the first sub-light by 90 degrees.

8. The WDM of claim 1, wherein the diffraction grating comprises:

a grating comprising an alignment surface, a first sleeve comprising a mount, the mount capable of contacting the grating, and an alignment plate coupled to an outer surface of the first sleeve, wherein the alignment plate is capable of contacting the alignment surface of the grating.

9. The WDM of claim 8, where in the grating comprises a substrate plate, the substrate plate comprising:

a concave holographic grating surface; and the alignment surface at an oblique angle to the grating surface.

10. The WDM of claim 9, wherein the substrate plate comprises a low-thermal-expansion expansion substrate.

11. The WDM of claim 9, wherein the grating surface diffracts light such that the grating surface operates in a Littrow configuration.

12. The WDM of claim 9, wherein the grating surface comprises a reflective concave surface in a geometric form of a spherical cap.

13. The WDM of claim 12, wherein a grating axis of the grating surface is substantially perpendicular to a chord to the grating surface at a center of the spherical cap.

14. The WDM of claim 9, wherein the substrate plate further comprises:

a back surface opposite to the grating surface, wherein the back surface is substantially flat and substantially perpendicular to a grating axis of the grating surface.

15. The WDM of claim 8, wherein the first sleeve comprises a low-thermal-expansion expansion material.

16. The WDM of claim 8, wherein the first sleeve is cylindrical in cross-section.

17. The WDM of claim 8, wherein the first sleeve comprises:

a slanted surface at an end of the first sleeve;

the mount coupled to the slanted surface; and a slot on the outer surface of the first sleeve coupled to the alignment plate.

18. The WDM of claim 17, wherein of the slanted surface is disposed at an angle such that an axis of the first sleeve is substantially parallel to a Littrow axis of the grating.

19. The WDM of claim 17, wherein the mount comprises a plurality of mounting pins.

20. The WDM of claim 8, wherein the diffraction grating further comprises:

a second sleeve, wherein at least a portion of the grating, the first sleeve, and the alignment plate are capable of residing within the second sleeve.

21. The WDM of claim 20, wherein the second sleeve comprises:

an open end;

a sealed end opposite to the open end; and a holding mechanism coupled to the sealed end and residing within the second sleeve, wherein the holding mechanism is capable of applying force to the grating to place the grating into proper alignment with the mount and the alignment plate.

22. The WDM of claim 21, wherein the holding mechanism is spring-loaded.

23. The WDM of claim 21, further comprising:

an end cap coupled to an open end of the second sleeve; and a fiber alignment block coupled to the end cap and optically coupled to the grating.

24. The WDM of claim 23, wherein the fiber alignment block comprises:

a plurality of fibers;

a plurality of grooves for holding the plurality of fibers;

an angled end face facing the grating; and a recess at an end opposite to the angled end face.

25. The WDM of claim 2, further comprising:

a path length compensation plate optically coupled between the birefringent walk-off plate and the lens.

26. A method for de-multiplexing a composite optical signal, comprising the steps of:

(a) separating the composite optical signal into a first sub-light and a second sub-light by a birefringent plate, wherein the first and second sub-lights have mutually orthogonal linear polarizations;

(b) rotating a polarization plane of the first sub-light by a reciprocal optical rotator;

(c) spatially separating the first sub-light into a first signal and a third signal, and the second sub-light into a second signal and a fourth signal by a diffraction grating, wherein the first and third signals comprise a first wavelength, and the second and fourth signals comprise a second wavelength;

(d) reflecting the first, second, third, and fourth signals toward the reciprocal optical rotator and the birefringent plate by the diffraction grating;

(e) rotating a polarization plane of the first and second signals by the reciprocal optical rotator; and (f) combining the first and third signals, and combining the second and fourth signals by the birefringent plate.

27. A method for multiplexing a plurality of signals, comprising the steps of:

(a) separating a first plurality of signals comprising a first wavelength into a first signal and a third signal, and separating a second plurality of signals comprising a second wavelength into a second signal and a fourth signal by a birefringent plate;

(b) rotating a polarization plane of the first and second signals by a reciprocal optical rotator;

(c) combining the first and second signals into a first sub-light, and the third and fourth signals into a second sub-light by a diffraction grating;

(d) reflecting the first and second sub-lights toward the reciprocal optical rotator and the birefringent plate by the diffraction grating;

(e) rotating a polarization plane of the first sub-light by the reciprocal optical rotator; and (f) combining the first and second sub-lights into a composite optical signal by the birefringent plate.

* * * * *